United States Patent [19]
Phillips et al.

[11] 4,065,914
[45] Jan. 3, 1978

[54] OFFSET BALER WITH STEERABLE CONTROL

[75] Inventors: Carmen S. Phillips; Ralph E. Beyer; Gerald E. Sepich, all of Memphis, Tenn.

[73] Assignee: International Harvester Company, Chicago, Ill.

[21] Appl. No.: 666,805

[22] Filed: Mar. 15, 1976

[51] Int. Cl.$^2$ ............................................. A01D 39/00
[52] U.S. Cl. ...................................... 56/341; 56/15.4; 56/15.5; 56/DIG. 2
[58] Field of Search .................. 56/341, DIG. 2, 15.4, 56/15.5, 1, 228, 218; 280/463, 468

[56] References Cited

U.S. PATENT DOCUMENTS

| | | | |
|---|---|---|---|
| 1,908,095 | 5/1933 | York et al. ............................ | 280/463 |
| 2,809,574 | 10/1957 | Hill et al. ............................ | 56/228 X |
| 3,487,448 | 12/1969 | Stemmerman ......................... | 280/468 |
| 3,665,690 | 5/1972 | Wenger .................................. | 56/341 |

*Primary Examiner*—Jay N. Eskovitz
*Attorney, Agent, or Firm*—Neal C. Johnson; Floyd B. Harman

[57] ABSTRACT

A baler adapted for towing by a tractor to pick up a windrow of hay and roll the hay into a cylindrical bale of substantial size and weight. The baler includes a front mounted pickup and a bale forming structure directly behind the pickup. The bale forming structure is of the type including an endless lower belt and a plurality of upper belts defining an expansible bale forming zone in conjunction with the lower belt. Suitable bale-density and bale-discharge structures are included. The baler includes a wheeled frame which provides a pivot connection for a draft tongue laterally offset from the baler centerline. The draft tongue extends forwardly for hitching to a tractor which can be disposed in towing relation alongside the windrow. A hydraulic cylinder is mounted between the baler frame and the draft tongue for powered steering of the baler relative to the windrow. This enables the operator to feed the hay into the bale forming structure in a systematic flow to build bales of uniform diameter and density end-to-end.

8 Claims, 3 Drawing Figures

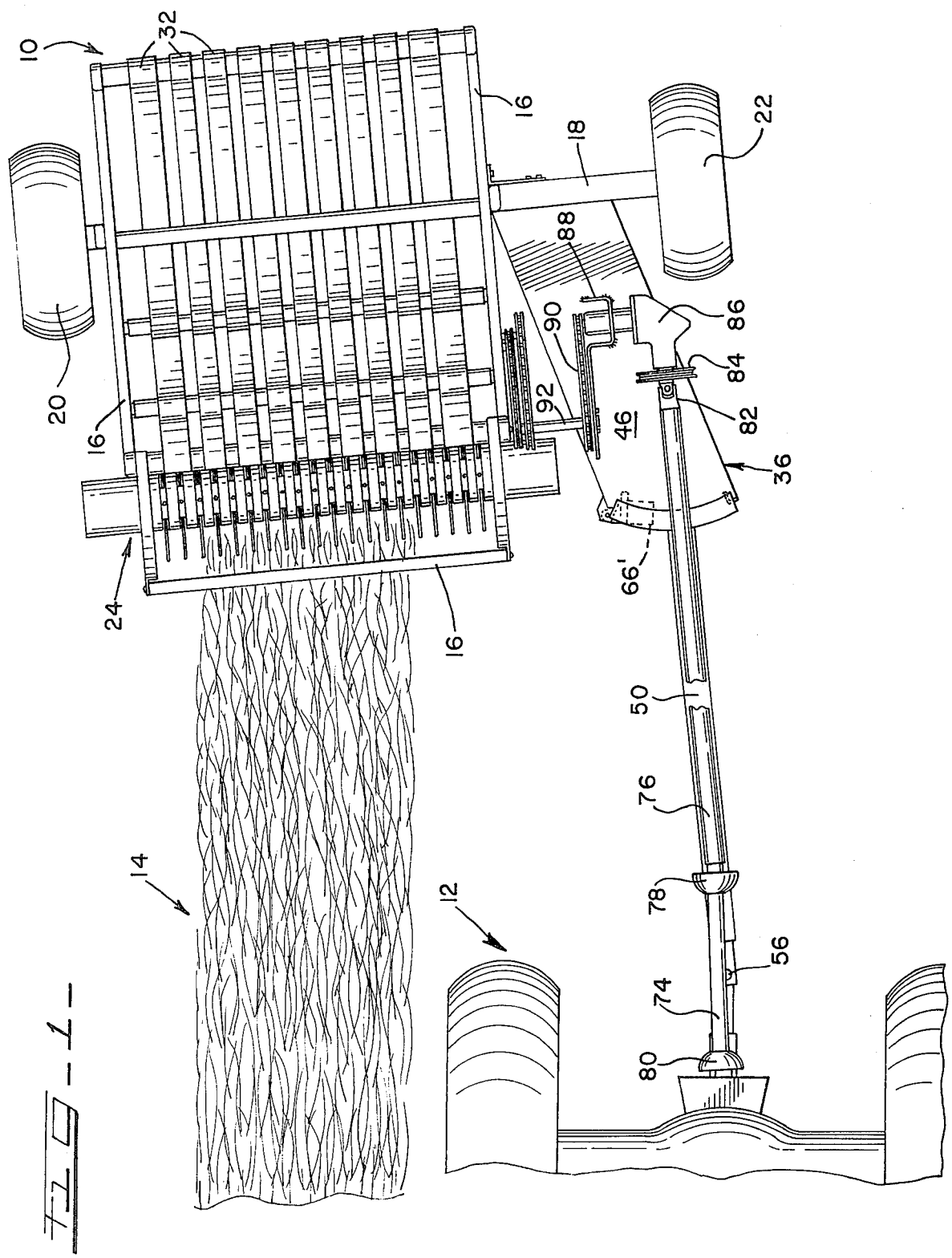

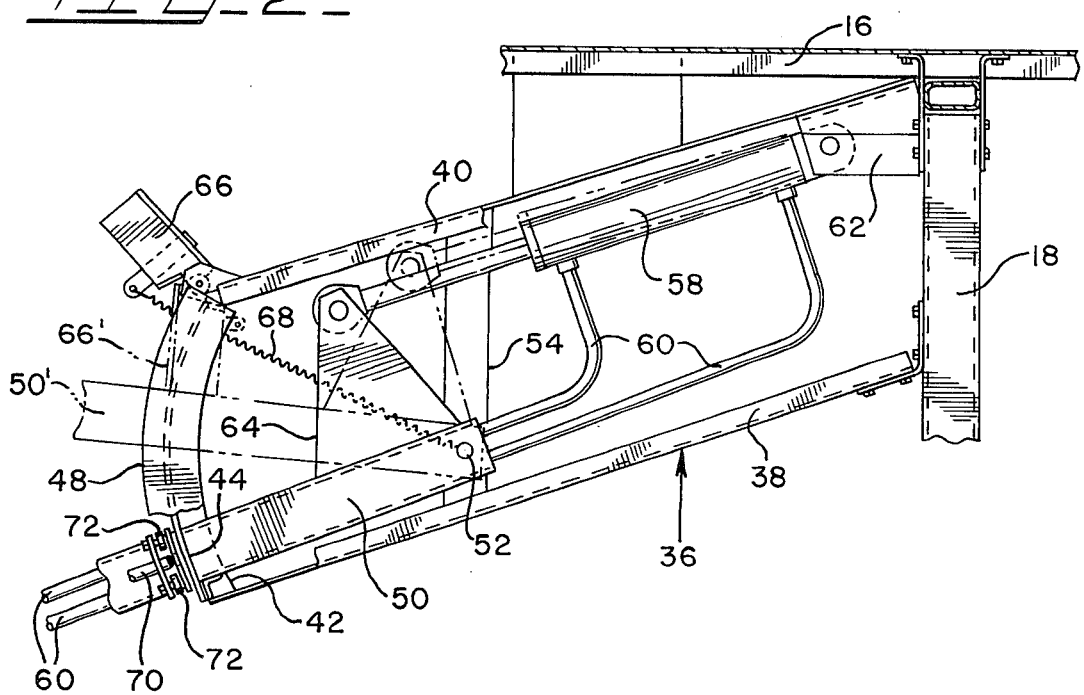
FIG-2-
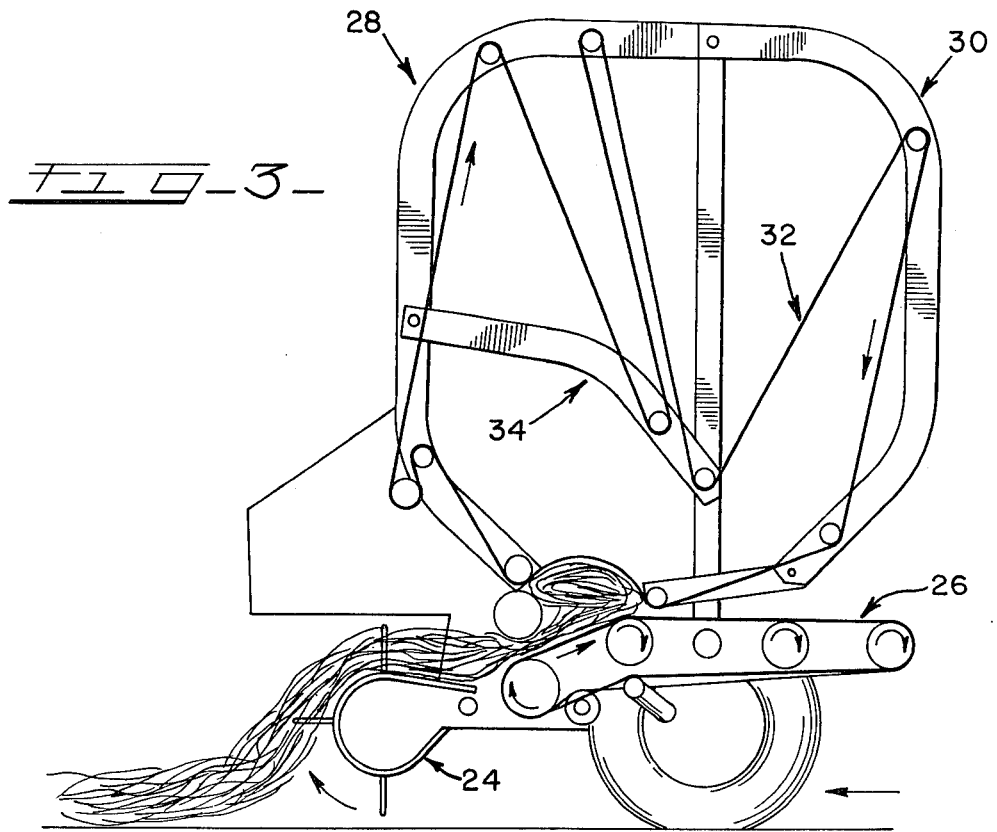
FIG-3-

OFFSET BALER WITH STEERABLE CONTROL

BACKGROUND OF THE INVENTION

1. Field of the Invention:

The invention relates to hay balers for cylindrical bales.

2. Prior Art:

Balers for cylindrical bales form bales from a windrow of hay which is often considerably narrower than the pickup mechanism of the baler. The normal procedure involves steering the towing tractor back and forth in a "weaving" motion so as to feed the hay into the bale forming zone in a sinuous pattern with the goal of forming the bale with a uniform diameter and density end-to-end. In actual practice the operation requires a technique which is somewhat more complex than merely weavng back and forth. To avoid forming barrel-shaped bales (that is, too much hay at the mid-length of the bale), the ideal procedure is to run parallel with the windrow, cross over, and then run parallel on the other side of the windrow. This procedure is particularly difficult since the baler is directly behind the tractor such that the driver must look directly rearwardly over his shoulder to monitor the progress of hay in-feedingand bale development.

A further problem associated with the tractor-weaving technique is that the tractor wheels will inevitably run onto or across the hay windrow. To the extent that this causes leaf-loss in the hay, the nutritional value of the hay as a feed crop will be reduced. Moreover, when the windrows are relatively large the hay can become entangled in the downwardly extending hitch structure of the tractor. In this regard it has been recommended that a shield or piece of belting be attached to the underside of the tractor drawbar to help prevent bunching of the hay.

While there are implements which are shiftable laterally relative to a towing tractor (U.S. Pat. No. 3,868,811 for example), such do not have the operating requirements or characteristics of a cylindrical baler. And while balers are known which have offset hitch tongues (U.S. Pat. No. 2,391,018), nothing therein precludes the necessity for weaving the baler-towing tractor back and forth when working in narrow windrows.

SUMMARY

The invention provides a method and means for steering a cylindrical baler relative to a towing tractor to control the infeed of hay along the transverse extent of the bale forming zone of the baler. This eliminates the need to "weave" the tractor back and forth as in conventional cylindrical baling practice. In a specific embodiment of the invention the baler includes a draft tongue pivotally connected to the baler frame proximate to a side thereof enabling the tractor to be disposed transversely offset from the baler and alongside the windrow during baling. This eliminates the need to drive the tractor back and forth across the windrow itself.

The elimination of the "weaving" technique provides less tiring work for the operator in guiding the tractor along the windrow. The offset hitch structure enables the operator to guide the tractor alongside rather than back and forth across the windrow. This precludes leaf-loss due to crushing by the tractor tires. There is no longer any need to modify or shield the hitch structure to prevent bunching of the hay as heretofore. And since the operator no longer need look directly behind him at the baler, he can devote more attention to safely steering the tractor relative to field obstructions and the like. Theforegoing is a statement of the general objects of the invention.

BRIEF DESCRIPTION OF THE DRAWINGS

FIG. 1 is a plan view of a baler incorporating the present invention;

FIG. 2 is an enlarged fragmentary plan view of a portion of the hitch and steering mechanism of the invention; and FIG. 3 is a schematic elevation of the baler during initial bale formation.

DESCRIPTION OF THE PREFERRED EMBODIMENT

Referring first to FIG. 1 there is shown a baler 10 towed by a tractor 12 for picking up and baling hay from a windrow 14. The baler includes a generally rectangular frame 16 and a frame extension member 18 projecting laterally from the frame 16 as shown. The baler is rollably supported on a pair of rubber-tired wheels 20 and 22 journalled on the frame 16 and extension member 18 respectively. It is apparent in FIG. 1 that the wheel 22 is disposed further from the longitudinal centerline of the baler frame 16 than is the wheel 20.

The hay pickup and bale-forming structure of the baler 10 is of known construction as shown in detail in U.S. Pat. No. 3,895,573. Accordingly, the principal components of the baler 10 are depicted only generally in FIGS. 1 and 3 and include a pickup 24, a lower conveyor 26, an upper framework 28, a gate 30, upper belts 32, and a belt tightner assembly 34. The hay is lifted from the ground by the pickup 24 and fed rearwardly onto the conveyor 26. The oppositely moving upper belts 32 cause the hay to be rolled upon itself into a cylindrical configuration — all in known manner.

As shown generally in FIG. 1 the balter 10 includes a frame unit 26 of box-like construction secured to and projecting forwardly from the frame extension 18. As shown in FIG. 2 the frame unit 36 includes a pair of side channels 38 and 40 secured to the frame extension 18 and extending forwardly in spaced parallel relation. An arcuate member 42 of right angle cross section is welded to the forward ends of channels 38 and 40 as is an arcuate strap 44 in upwardly spaced parallel relation to the member 42. The frame unit 36 further includes a top plate 46 covering the entire unit and an arcuate plate 48 welded to the top of the strap 44 to define an overhanging arcuate lip.

An elongated draft tongue 50 of tubular construction is pivotally connected to the frame unit 36 for coupling the baler to the tractor. The tongue 50 is connected to the unit 36 by a vertical pin 52 mounted on a cross brace 54 and the top plate 46. The tongue 50 projects forwardly from the pivot pin 52 through the gap defined between the member 42 and the strap 44 and is pivotable about the pin 52 through an angle determined by the distance between the forward ends of the channels 38 and 40. As shown in FIG. 1 the forward end of the tongue 50 is coupled to the hitch of the tractor 12 by a hitch pin 56.

The baler is power steerable relative to the tractor by means including a double-acting hydraulic pistoncylinder unit 58 hydraulically connected to the hydraulic power source of the tractor by lines 60 extending through the draft tongue 50. The cylindrical portion of the unit 58 is pivotally connected to a bracket 62 secured to the channel 40 and the frame extension 18. The piston portion of the unit 58 is pivotally connected to pair of vertically spaced gusset plates 64 welded to the tongue 50. It is apparent with reference to FIG. 2 that extension and retraction of the unit 58 swings the tongue 50 back and forth about the pivot pin 52.

The range of movement of the tongue 50 is selectable by the provision of a stop member 66 pivotable about a vertical axis between the solid line and dotted line positions of FIG. 2. In the dotted line position the stop member 66' is disposed between the spaced members 42 and 44 to limit the range of movement of the tongue 50 during baling. A coil spring 68 is effective in tension to retain the member 66 in this position. When it is desired to dispose the baler to a position more directly behind the tractor for transport, the member 66 is swung out to the solid line position and retained by a suitable latch (not shown). The tongue 50 is lockable in the transport position against the channel 40 by means including a pin 70 insertable into an opening (not shown) in the arcuate strap 44. A pair of rollers 72 is mounted on the tongue 50 in rollable engagement with the underside or lip of the plate 48 to facilitate swinging movement of the tongue.

The bale forming components of the baler 10 are power driven from the PTO of the tractor 12. As shown generally in FIG. 1, the drive line includes shafts 74 and 76 interconnected by a universal joint 78. The frontmost shaft 74 is connectable to the tractor PTO through a universal joint 80. The other shaft 76 is connected through a universal joint 82 to a slip clutch 84. It will be understood that the universal joint 82 is coincident with the vertical pivot axis of the tongue 50 defined by the pivot pin 52. Power is fed through a right angle gear box 86 which is mounted on a plate 88 welded on the top plate 46 of the frame unit 36. Power is then transmitted through a chain and sprocket drive 90 to a power input shaft 92 journalled on the plate 88. The shaft 92 imparts drive to the operating components of the baler through various chain and sproket drives shown and described in the above mentioned U.S. Pat. No. 3,895,573.

In operation the stop member 66 is unlatched and permitted to swing to the dotted line position of FIGS. 1 and 2. The pin 70 is retracted to free the tongue 50 for swinging movement. The offset mounting of the tongue 50 permits the tractor 12 to be driven alongside the windrow 14 while disposing the baler 10 over the windrow. The operator can then steer the baler so as to shift the pickup 24 back and forth relative to the windrow by simply extending and retractor the hydraulic unit 58. The effect of the extension and retraction is to turn or oscillate the baler about the pivot pin 52 within the limits defined by the range of movement relative to the tongue 50. The ultimate result of the steering action is to feed hay uniformly along the length of the bale-forming zone of the baler to create bales having uniform diameter and density end-to-end.

After completion of baling, the baler may be set in transport position by swinging the stop member 66 to its solid line position, retracting the hydraulic unit 58 to shift the baler about the pin 52 to dispose the tongue 50 against the channel 40, and extend the pin 70 into the appropriate opening in the strap 44 to lock the tongue in place.

What is claimed is:

1. In a baler adapted for towing by a tractor, the combination comprising:
   a pickup for picking up hay from a windrow;
   means defining a transversely extending bale forming zone for receiving hay from the pickup;
   means for forming the hay into a cylindrical bale;
   and means for selectively steering said baler transversely relative to said tractor during bale formation to control the feed of hay along the transverse extent of said zone to form bales of uniform diameter.

2. In a baler adapted for towing by a tractor, the combination comprising:
   a pickup for picking up hay from a windrow;
   means defining a transversely extending bale forming zone for receiving hay from the pickup;
   means for forming the hay into a cylindrical bale;
   a draft structure having a pivot connection to said baler and adapted for coupling to the tractor;
   and power means for oscillating said baler horizontally about said pivot connection during bale formation to shift the pickup transversely back and forth relatively to said windrow so that hay is fed into said zone along its length to form bales of uniform diameter.

3. An improved baler for lifting hay from a windrow and forming the hay into cylindrical bales, comprising:
   a mobile frame adapted to be towed by a tractor;
   a transversely elongated pickup on the frame for picking up the windrowed hay;
   means defining a transversely extending bale forming zone on said frame for receiving hay from said pickup;
   means for forming the hay into a cylindrical bale;
   an elongated draft tongue adapted to be coupled to the tractor and having a pivot connection to said frame proximate to one side thereof whereby the tractor may be disposed transversely offset from the baler and alongside the windrow during baling;
   and power means operative between said frame and said tongue for oscillating said frame about said pivot connection during bale formation to shift the pickup transversely back and forth across the windrow to feed hay into the zone along its length to form bales of uniform diameter.

4. An improved baler for lifting hay from a windrow and forming the hay into a cylindrical bale, comprising:
   means defining a bale forming structure of a given transverse extent adapted to receive hay;
   means for rolling the same into a cylindrical bale;
   a pickup disposed forwardly of said structure for lifting hay from the windrow and feeding the same rearwardly into said structure;
   a wheeled frame supporting said pickup and said bale forming structure for towing by a tractor, said frame including a portion projecting transversely beyond a side of the bale forming structure;
   a draft structure pivotally connected to said frame portion adapted for coupling to the tractor while disposed alongside the windrow;
   and power means operative between said frame and said draft structure for steering the baler relative to the tractor during bale formation so that hay may be fed uniformly into the bale forming structure while the tractor is driven alongside the windrow.

5. The subject matter of claim 4, wherein said frame portion includes transversely spaced stop structures effective to limit the range of steering movement of the baler relative to the draft structure, one of said stop structures being mounted for selective swinging movement away from the other thereby providing an additional range of movement of the baler to a transport position behind the tractor.

6. In a baler adapted for towing by a tractor, the combination comprising:
  a pickup for picking up hay from a windrow;
  means defining a transversely extending bale forming zone for receiving hay from the pickup; and forming means for the hay into a cylindrical bale;
  and means for steering said baler transversely relative to said tractor during bale formation thereby controlling the feed of hay along the transverse extent of said zone to form bales of uniform diameter.

7. In a baler adapted for towing by a tractor, the combination comprising:
  a pickup for picking up hay from a windrow;
  structure defining a bale forming zone for receiving hay from the pickup;
  means for forming the hay into a cylindrical bale;
  and means for towing said baler in an oscillating path encompassing the windrow during bale formation while maintaining the tractor in offset parallel relation to the windrow.

8. A method of forming cylindrical hay bales of uniform diameter with a tractor drawn baler having a pickup and a bale forming zone which may be of greater width than a windrow of hay to be picked up and baled, comprising the steps of:
  driving the tractor alongside and generally parallel to the windrow;
  towing the baler laterally offset from the tractor and over the windrow;
  picking up the hay from the windrow and feeding the hay into the zone;
  and steering the baler relative to the tractor in a weaving or generally sinuous path across the windrow so that the hay is fed into the zone along its length to form a bale of uniform diameter.

* * * * *